No. 890,710. PATENTED JUNE 16, 1908.
J. RIDDELL.
BALANCING MACHINE.
APPLICATION FILED SEPT. 11, 1907.

2 SHEETS—SHEET 1.

WITNESSES
George W. Tilden.
Marcus L. Byng.

INVENTOR
JOHN RIDDELL.
BY Albert H. Davis
ATT'Y.

No. 890,710. PATENTED JUNE 16, 1908.
J. RIDDELL.
BALANCING MACHINE.
APPLICATION FILED SEPT. 11, 1907.

2 SHEETS—SHEET 2.

WITNESSES
George W. Tilden
Marcus L. Byng

INVENTOR
JOHN RIDDELL.
BY Albert G. Davis
ATT'Y.

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

BALANCING-MACHINE.

No. 890,710.      Specification of Letters Patent.      Patented June 16, 1908.

Application filed September 11, 1907. Serial No. 392,273.

*To all whom it may concern:*

Be it known that I, JOHN RIDDELL, a citizen of the United States, residing at Schenectady, county of Schenectady, State of New York, have invented certain new and useful Improvements in Balancing-Machines, of which the following is a specification.

My invention relates to a machine for balancing rotative bodies of such a character that they require to be balanced with the utmost precision, as for example, bucket wheels for elastic fluid turbines, and is an improvement on the machine forming the subject-matter of my pending application, Serial No. 247,909, so much of the broader aspects of the invention as is common to the two applications being claimed in said application. These rotative bodies are operated at high angular velocities and unless they are accurately balanced their rotation is attended with more or less vibration, which, at the high speeds of operation, may be so great as to be prohibitive or even destructive.

The object of the invention is to provide a thoroughly reliable machine of the static balancing type for balancing bucket wheels or similar bodies and with which rapid and satisfactory balancing can be done with greater facility and accuracy.

Figure 1:
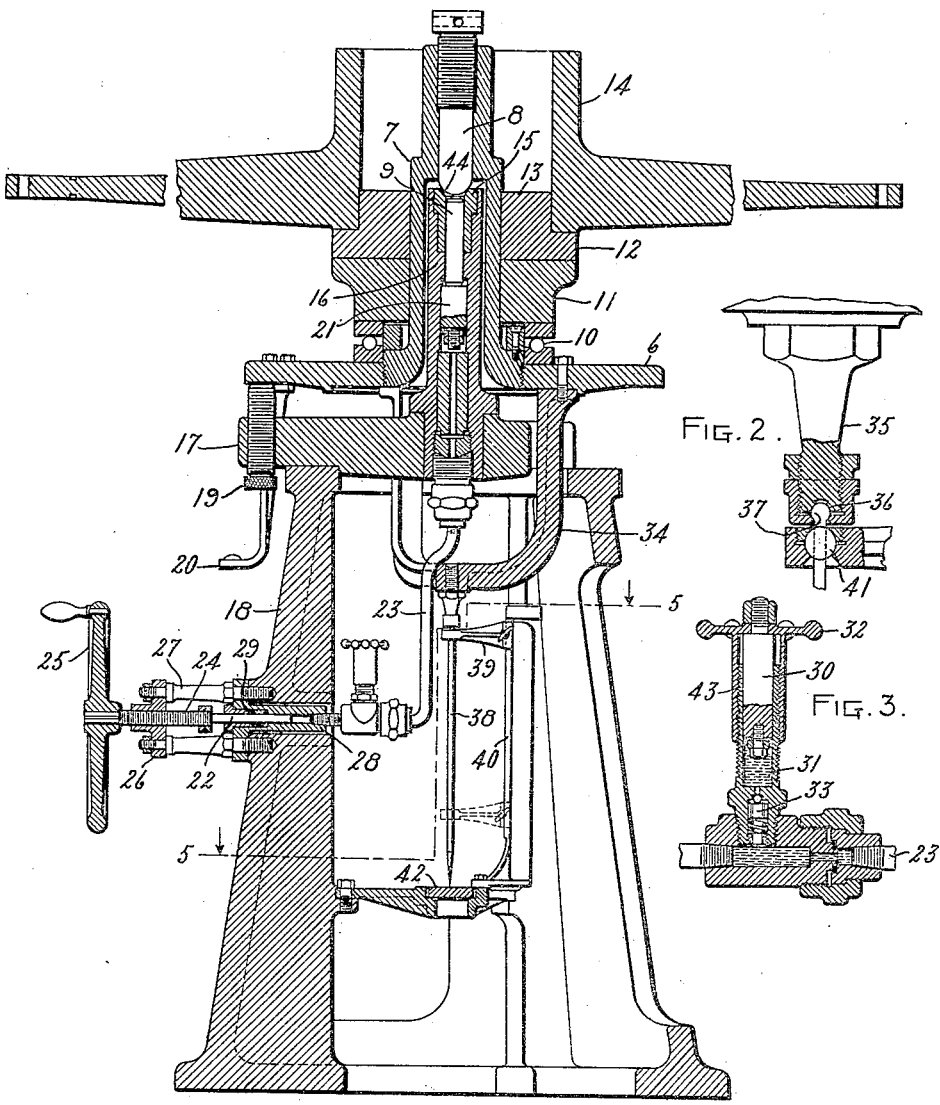
Figure 4:
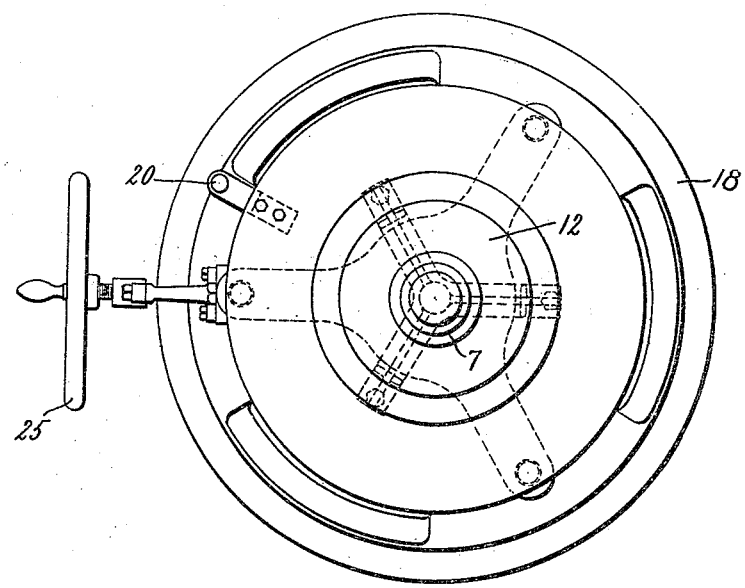
Figure 5:
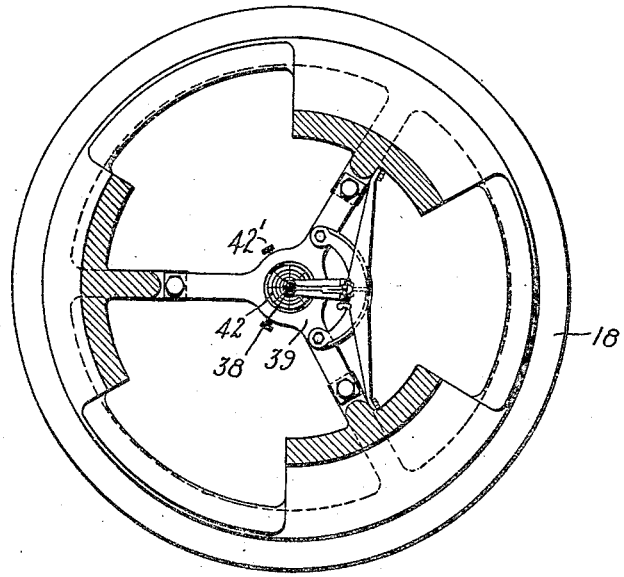

In the accompanying drawings, illustrating one of the embodiments of my invention, Figure 1 is a central vertical section of the balancing machine with a turbine wheel in position thereon; Fig. 2 is a view partly in section showing the mounting of the upper end of the indicating pointer and the fulcrum for the same; Fig. 3 is a section through the pump or ram for introducing fluid into the hydraulic control mechanism; Fig. 4 is a top view of the machine; and Fig. 5 is a section on the line 5—5 of Fig. 1, looking in the direction of the arrows.

The balancing table 6 is provided with a central upwardly-extending column 7. Mounted in the upper end of the column is an adjustable pin or bolt 8 having a hemispherical end which forms one member of the universal bearing or pivot for the table. The other member of the bearing is a longitudinally movable pin 9 having a flat surface at its upper end which coöperates with the hemispherical surface of the pin 8. On the table 6 at the base of the column 7 is a ball-bearing 10 which supports a rotatable block 11. Rotatably mounted on the column and supported by the block is a holder 12, having a hub 13 which fits the bore of the turbine wheel 14. Holders having hubs of different diameters are provided for the various sizes of wheels to be handled. It is necessary to turn the wheel about its axis during balancing. The ball-bearing 10 permits this to be done very easily by the workman.

The pin 9 above described is slidably mounted in a bushing 15 secured in the upper end of a stationary post 16 which projects upward from a three-armed spider 17 fastened to the top of the main frame or standard 18 of the machine. A suitable clearance is provided between the post and the hollow interior of the column so that the balancing table may tilt about the pivot 8, 9 in the process of balancing. The bolts or set-screws 19 mounted in the ends of the arms of the spider 17 are used to level the table 6 and are so adjusted that they keep it level without performing any special supporting function when the support of the wheel and table is transferred from the pin 9 to the seat 44; the weight of the parts being borne by the seat. A level indicating device 20 of any well known construction may be attached to the table to facilitate the balancing operation.

The lower end of the pivot pin 9 rests on a piston 21 mounted in a suitable bore in the post 16. The pin might be formed as a part of the piston, but I prefer the arrangement shown. The bore of the post is connected with the cylinder 28 of a hydraulic ram 22 by means of the piping 23. The plunger 24 of the ram has a hand-wheel 25 attached to its outer end. The portion of the plunger adjacent the hand-wheel is provided with a screw-thread which works in a nut 26 secured to the ends of the studs 27, projecting from the side of the standard 18. These studs are also used to secure the pressure cylinder 28 of the ram in an opening in the wall of the standard. A stuffing-box 29 prevents leakage from the interior of the cylinder along the plunger. By rotating the hand-wheel 25, the plunger is moved in or out. The pressure exerted by the inward movement forces the piston 21 and pin 9 upward and raises the rounded end of the pin 8 from contact with the conical seat 44 on the bushing 15. When the plunger is retracted, the weight of the table and the wheel forces the pin 9 downward and transfers the support of these parts from the flat upper end of the pin 9 to the conical seat on the bushing, as shown in Fig. 1. The conical surface of the seat guides the table to a central position as the rounded end of the pin 8 is lowered into contact with the seat. The parts are so proportioned that the pivotal point of the table 6 normally lies in the central horizontal plane of the wheel, this arrangement securing the best results in practice.

The manually-operated piston or plunger 30, moving in the cylinder 31 attached to the piping 23 is used to maintain the supply of fluid in the system substantially constant so that a given movement of the hand-wheel 25 will always bring the parts to the desired position. The space at the lower end of the cylinder is normally filled with the pressure fluid. If the loss of fluid by leakage is small, the supply in the pressure pipe may be replenished by turning the hand-wheel 32 and forcing the piston 30 farther into the cylinder 31. The movement of the piston relative to cylinder is caused by the engagement of the threaded sleeve 43 on the hand-wheel with the thread on the outside of the cylinder 31. If by reason of continued leakage in small quantities, the volume of fluid is materially reduced an additional quantity may be introduced by removing the piston 30 and refilling the cylinder 31. The piston is then replaced and forced a suitable distance into the cylinder. A ball check valve 33 prevents any backward flow from the piping 23 into the cylinder.

A saddle piece 34 projects downward from the under side of the table 6 through suitable openings in the top of the standard 18. An arm 35 is attached to the lower end of the saddle piece and carries a bearing or socket 36 for the spherical end 37 of the pointer 38. A bracket 39 adjustably mounted on a guide or support 40 on the standard carries a rotatable ball 41 having a diametrical opening through which the pointer 38 may slide. This ball forms a fulcrum for the pointer which may be adjusted up and down on the guide 40, as indicated in full and dotted lines in Fig. 1, to vary the relative length of the two portions or arms of the pointer. Mounted centrally below the end of the pointer is a dial 42 graduated as shown in Fig. 5. Suitable adjusting screws 42' are provided for centering the dial. These graduations consist of a series of closely spaced concentric circles divided into a number of equal sectors so that both the direction and amount of the unbalanced mass are indicated.

During the beginning of the balancing operation, the fulcrum 41 is located near the lower end of the support 40 because at this time the motion imparted to the upper end of the pointer due to the lack of balance of the wheel is comparatively large. When the workman has secured such a distribution of the mass that the pointer indicates the wheel is balanced for the first approximation with the fulcrum in the lower position, the bracket and fulcrum are then raised so as to increase the length of the lower arm of the pointer. In this position the movement transmitted from the wheel is magnified and may show a lack of balance which the first and less sensitive adjustment of the mechanism failed to indicate to the operative.

In using the machine the table is first lowered by rotating the hand-wheel 25 to reduce the pressure on the piston 21 which sustains the pin 9 so that it is supported by the seat 44, and the leveling screws 19 are adjusted to bring the table to a level position. This level is carefully tested by suitable level indicating devices. The wheel is then placed in position by means of the shop crane, or otherwise. The fulcrum 41 is moved to its lowest position. The hand-wheel 25 is rotated to force the plunger inward and raise the table with the wheel thereon from the seat, the point of the support being transferred from the seat to the bearing pin to position the table for universal movement on the vertical pivot. When the wheel is out of balance the table settles at a point in line with the heavy portion and actuates the pointer. The position of the pointer with respect to the dial indicates the location of the heavy portion of the wheel. After noting this location, the wheel is lowered until the table 6 is supported by the seat and kept in a level position by the screws 19. The wheel is then rotated on the ball bearing through 90 degrees, more of less, again brought to balancing position and the position of the pointer relative to the dial noted. This operation is repeated until the wheel has been turned through 360 degrees. If the table has been accurately leveled and the dial is properly centered the different readings on the dial should lie on a circle concentric with its center. If this is not the case, the dial is adjusted to the desired central position. The next step is to determine the proper location and quantity of the mass to be added at the light portion of the wheel, or removed from the heavy portion of it to bring the pointer to the center of the dial. This is done by trial or by calculation and trial. Each time a mass is applied to or removed from the wheel, the table is preferably lowered to rest on the seat and leveling screws to prevent excessive vibration of the table and the pointer and injury to the pivot. After the mass is adjusted to bring the pointer to the center, the wheel is rotated through a suitable angle, the table is raised to balancing position, and the position of the pointer with respect to the dial ascertained in this new position. This procedure is repeated with masses of different weight and in different locations until a condition is reached in which the pointer coincides with the center of the dial in all positions to which the wheel may be turned about its axis, indicating an accurate balance within the degree of sensitiveness of the apparatus with the parts of the indicating mechanism in the position described. This balance is then tested by moving the fulcrum upward to make the indicating mechanism more sensitive by causing it to multiply the movement of the wheel, if any, to a much greater extent, and repeating the above process.

The hydraulic mechanism for raising and lowering the balancing table and the wheel or other body upon it greatly facilitates the handling of the apparatus by the workman. Some of the wheels to be balanced are from twelve to thirteen feet in diameter and weigh from eight to ten tons, requiring a pressure of approximately ten thousand pounds per square inch in the ram. To handle heavy wheels by means of a screw and lever or bar, as in my first machine, has proved laborious and tends to disturb the adjustment by introducing forces transverse to the vertical axis of the machine. The hydraulic mechanism of the improved machine exerts its lifting force in the direction of the axis and is compactly arranged within the central portion of the apparatus with the operating wheel conveniently located at one side of the standard to actuate the lower pivot pin. This arrangement performs its operations in a very efficient manner and leaves the top of the machine free and unobstructed for the placing and removal of wheels. If the upper pin were under the control of a ram or other pressure device, the piping or connections coming from above would interfere with the handling of the wheels and the machine would be less compact and less effective in its output.

The adjustable fulcrum for the pointer secures a much higher degree of accuracy and greater rapidity in balancing than is possible with a fixed fulcrum. If the fulcrum were placed in its upper position when beginning the operation of balancing, the mechanism would be too sensitive. The pointer would swing widely beyond the dial and the process would be hindered rather than aided. But by beginning with the less sensitive position of the fulcrum and gradually changing it to its more sensitive upper position, the movement of the pointer is kept within convenient limits and the process is both rapid and more accurate.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In a balancing machine, the combination of a standard, a balancing table, a pivotal mounting for the table on the standard, means on the standard for supporting the table in inoperative position, a hydraulic device for moving the table to operative balancing position on its pivotal mounting and for moving it to rest on the said supporting means, and an indicating mechanism actuated by the table.

2. In a balancing machine, the combination of a standard, a balancing table, means for supporting the table in balancing position for universal movement on the standard about a vertical axis, a support on the standard for the table when in inoperative position, a hydraulic ram acting on said means for raising the table to balancing position and lowering it to inoperative position, and an indicating mechanism actuated by the table.

3. In a balancing machine, the combination of a standard, a balancing table, pins on the standard and table forming a pivot which supports the table for universal movement on the standard, a seat concentric with the pivot, a hydraulic device for moving one of the pivot pins to transfer the support of the table from the pivot to the seat and vice versa, and an indicating mechanism actuated by the table.

4. In a balancing machine, the combination of a standard, a pivot pin mounted for longitudinal movement therein, a balancing table, a pivot pin mounted in the table and coöperating with the first mentioned pivot pin to support the table for universal movement about a vertical axis, means for moving the first pivot pin, and an indicating mechanism actuated by the table.

5. In a balancing machine, the combination of a standard, a pivot pin mounted for longitudinal movement therein, a balancing table, a pivot pin mounted in the table which coöperates with the first mentioned pin to support the table, one of the pins having a flat bearing surface for engagement with a spherical surface on the other, a seat adjacent the engaging ends of the pins, means for moving the first pivot pin to transfer the support of the table from it to the seat or vice versa, and an indicating mechanism actuated by the table.

6. In a balancing machine, the combination of a standard, an upright hollow post on the standard, a pivot pin mounted for longitudinal movement in the upper end of the post, a seat on the post adjacent the end of the pin, a balancing table surrounding the post and having a pivot pin for engagement with the first mentioned pin, a piston within the post below the pin, hydraulic means for actuating the piston to move the pin to transfer the support of the table from the seat to the pin or vice versa, means for limiting the movement of the table about the pivot, and an indicating mechanism actuated by the table.

7. In a balancing machine, the combination of a balancing table having a central column projecting upward therefrom, a holder for the body to be balanced rotatably mounted on the column, a standard, a post on the standard extending upward into the column, a pivot pin in the upper end of the column, a coöperating pivot pin slidably mounted in the adjacent end of the post, a conical seat on the post concentric with the axis of the pivot, a piston in the interior of the post which moves the pin, a hydraulic ram, piping transmitting pressure from the ram to move the piston and pin, thus transferring the support of the table from the seat to the pin or vice versa, adjustable means for limiting the pivotal movement of the table to keep it level when supported on the seat, and indicating mechanism actuated by the table.

8. In a balancing machine, the combination of a standard, a balancing table mounted thereon, a pivot for the table, a seat adjacent the pivot, means for transferring the support of the table from the pivot to the seat and vice versa, means for leveling the table when supported on the seat, and an indicating mechanism actuated by the table.

9. In a balancing machine, the combination of a standard, a balancing table mounted thereon, members on the standard and table forming a pivotal bearing which supports the table for universal movement on the standard, a seat concentric with the pivot, a hydraulic device for moving one of the pivot members to transfer the support of the table from the pivot to the seat and vice versa, means mounted on the standard for leveling the table when supported on the seat, and an indicating mechanism actuated by the table.

10. In a balancing machine, the combination of a standard, a balancing table, a holder for the work, a ball-bearing on the table which supports the holder, a universal pivot for the table, a seat on the standard concentric with the pivot, means for raising the table to balancing position on the pivot and lowering it from that position to support it on the seat, screws mounted in the standard for leveling the table when supported by the seat, and an indicating mechanism actuated by the table.

11. In a balancing machine, the combination of a standard, having a hollow upright post thereon, a balancing table having a pivot, a coöperating pivot slidably mounted in the post, a hydraulic piston for moving the last named pivot working in the bore of the post, a pressure cylinder on the standard, piping connecting the cylinder with the bore of the post, a plunger in the pressure cylinder having a threaded portion, a stationary nut engaging said threaded portion, and a handwheel for rotating the plunger in the nut to vary the pressure exerted on the piston.

12. In a balancing machine, the combination of a standard, a balancing table mounted on the standard, and an indicating mechanism comprising a two-armed pointer actuated by the table, a fulcrum for the pointer intermediate its ends, a dial for indicating the movements of the pointer, and means for adjusting the mechanism to vary the lengths of the arms of the pointer relative to each other to change the sensitiveness of the indicating mechanism.

13. In a balancing machine, the combination of a standard, a balancing table pivotally mounted on the standard, and an indicating mechanism comprising a two-armed pointer connected to the table, a dial adjacent one end of the pointer for indicating its movements, a fulcrum mounted on the standard intermediate the ends of the pointer, and means for adjusting the mechanism to vary the relative lengths of the arms of the pointer to obtain different degrees of sensitiveness.

14. In a balancing machine, the combination of a standard, a balancing table mounted for universal movement thereon, and an indicating mechanism comprising a pointer pivotally connected to the table, a fulcrum for the pointer, an adjustable bracket in which the fulcrum is mounted, means for securing the bracket in different positions on the standard, and a dial adjacent one end of the pointer.

15. In a balancing machine, the combination of a standard, a balancing table mounted for universal movement thereon about a vertical pivot, and an indicating mechanism comprising an arm projecting downward from the table, a pointer, a ball and socket joint between the arm and one end of the pointer, a vertical guide on the standard, a bracket adjustably mounted on the guide, a ball rotatably mounted in the bracket which forms a fulcrum for the pointer and has a diametrical opening in sliding engagement therewith, and a dial adjacent the other end of the pointer.

16. In a balancing machine, the combination of a standard, a balancing table mounted on the standard, and means for raising and lowering the table comprising a cylinder, a piston in the cylinder, a hydraulic ram, piping connecting the ram with the cylinder, and a device for introducing fluid into the piping to replenish loss by leakage and maintain a substantially constant quantity of fluid in the pressure system.

17. In a balancing machine, the combination of a standard, a balancing table, a pivot supporting the table for universal movement on the standard, and means for raising and lowering the pivot comprising a cylinder, a piston in the cylinder, a hydraulic ram, piping connecting the ram with the cylinder, a second cylinder having a connection with the piping between the ram and the first cylinder, a check-valve in the connection, a piston in the second cylinder, and means for operating said piston to force fluid past the check valve into the pressure piping.

In witness whereof, I have hereunto set my hand this 9th day of September, 1907.

JOHN RIDDELL.

Witnesses:
BENJAMIN B. HULL,
FRANK J. DORE.